Sept. 6, 1938.    A. OBERHOFFKEN    2,128,960
MILLING MACHINE
Filed Jan. 13, 1936    4 Sheets-Sheet 1
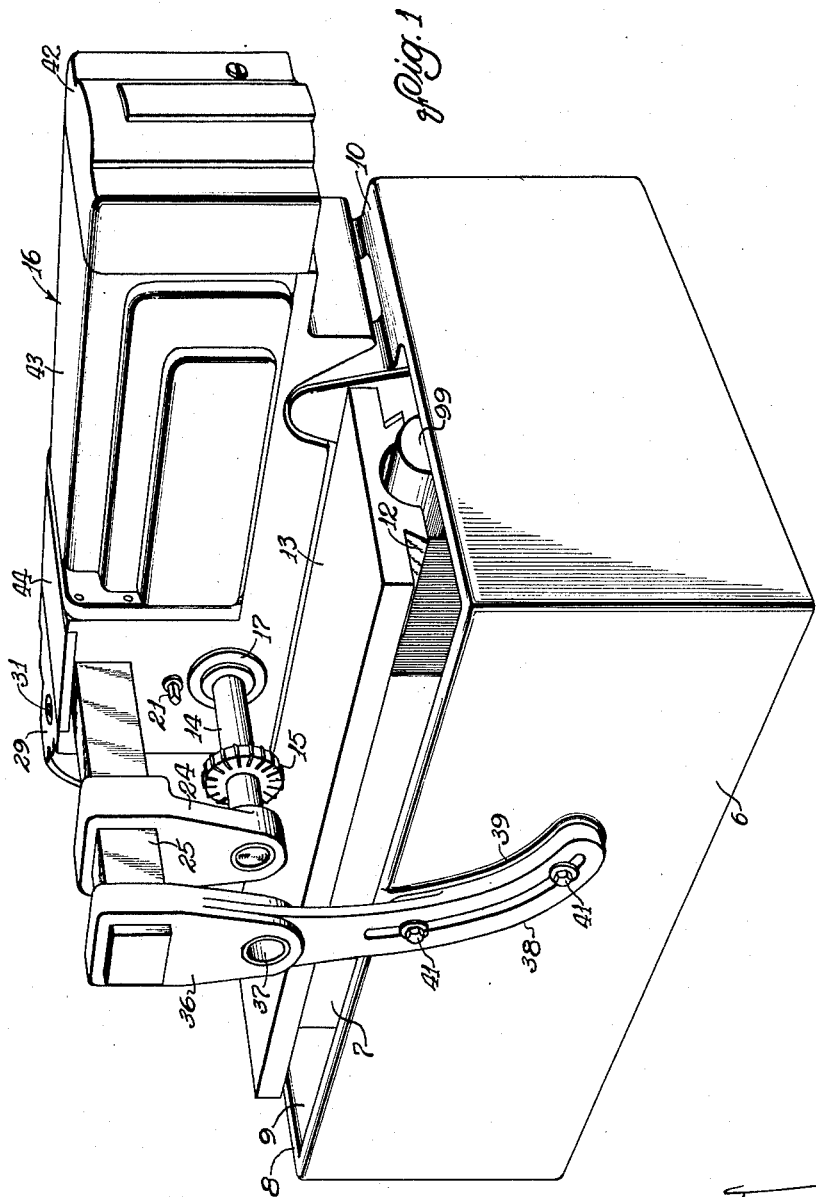
INVENTOR
Alexander Oberhoffken
By Parker, Carlson, Pitzner & Hubbard
ATTORNEYS Sept. 6, 1938.  A. OBERHOFFKEN  2,128,960
MILLING MACHINE
Filed Jan. 13, 1936  4 Sheets-Sheet 2
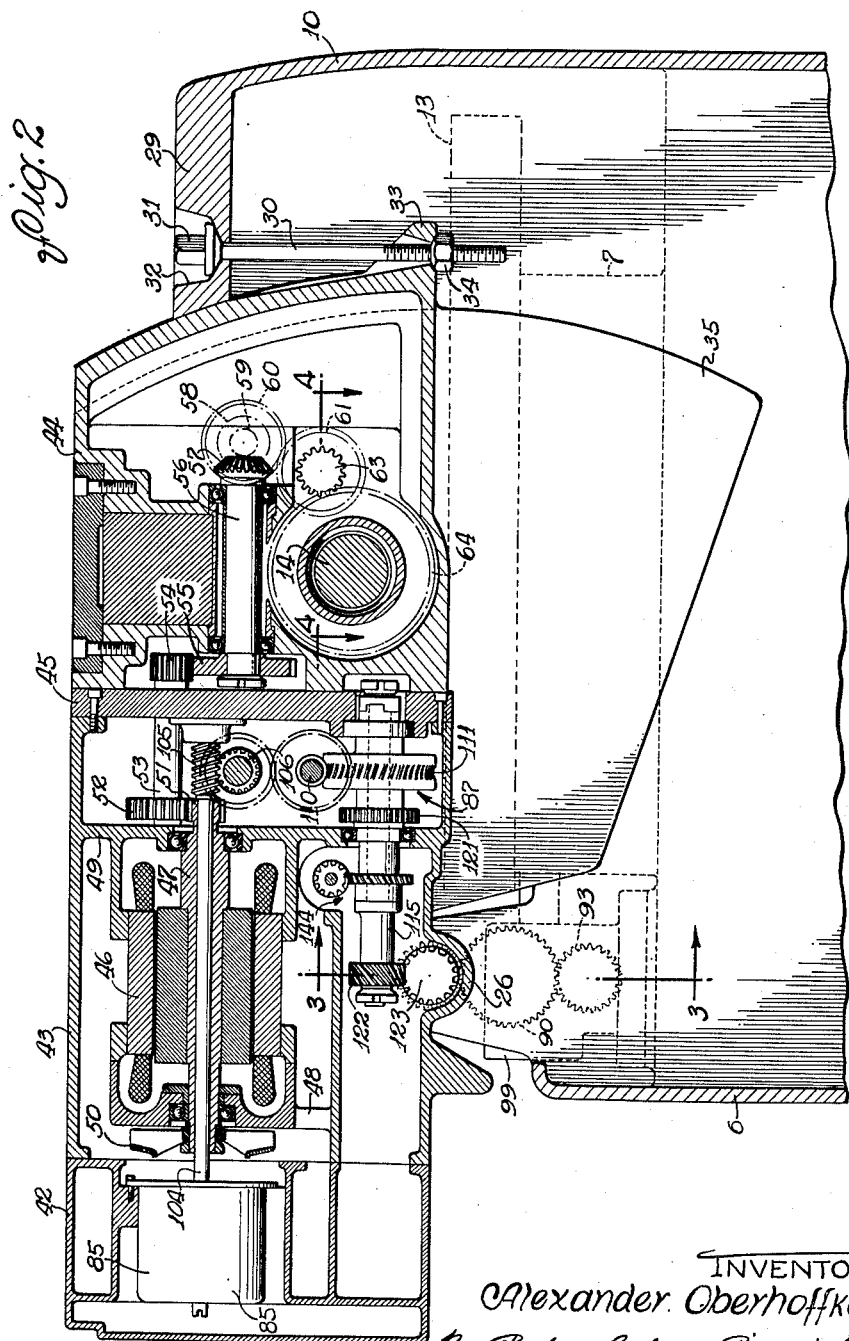
INVENTOR
Alexander Oberhoffken
By Parker, Carlson, Pitner & Hubbard
ATTORNEYS

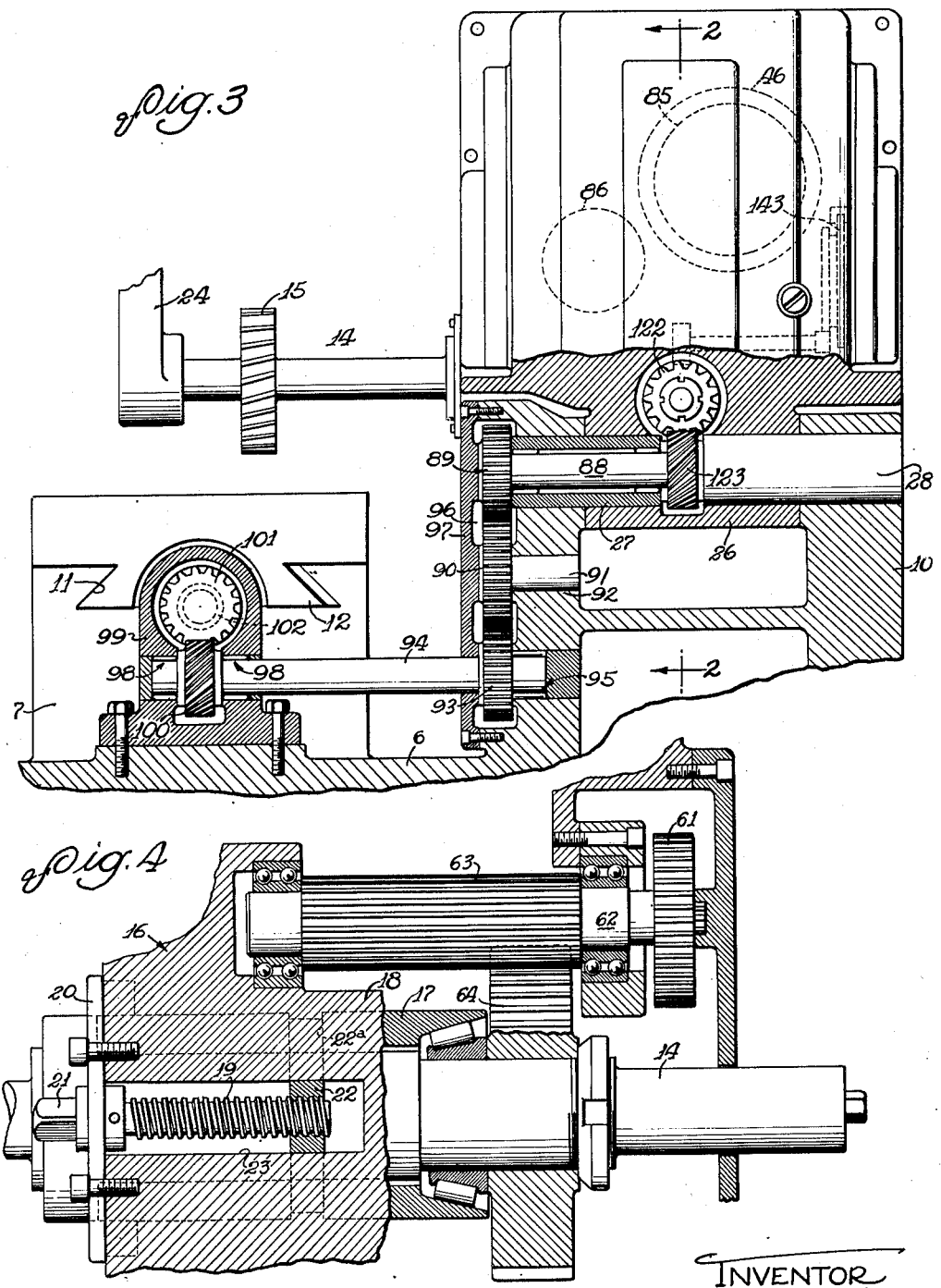

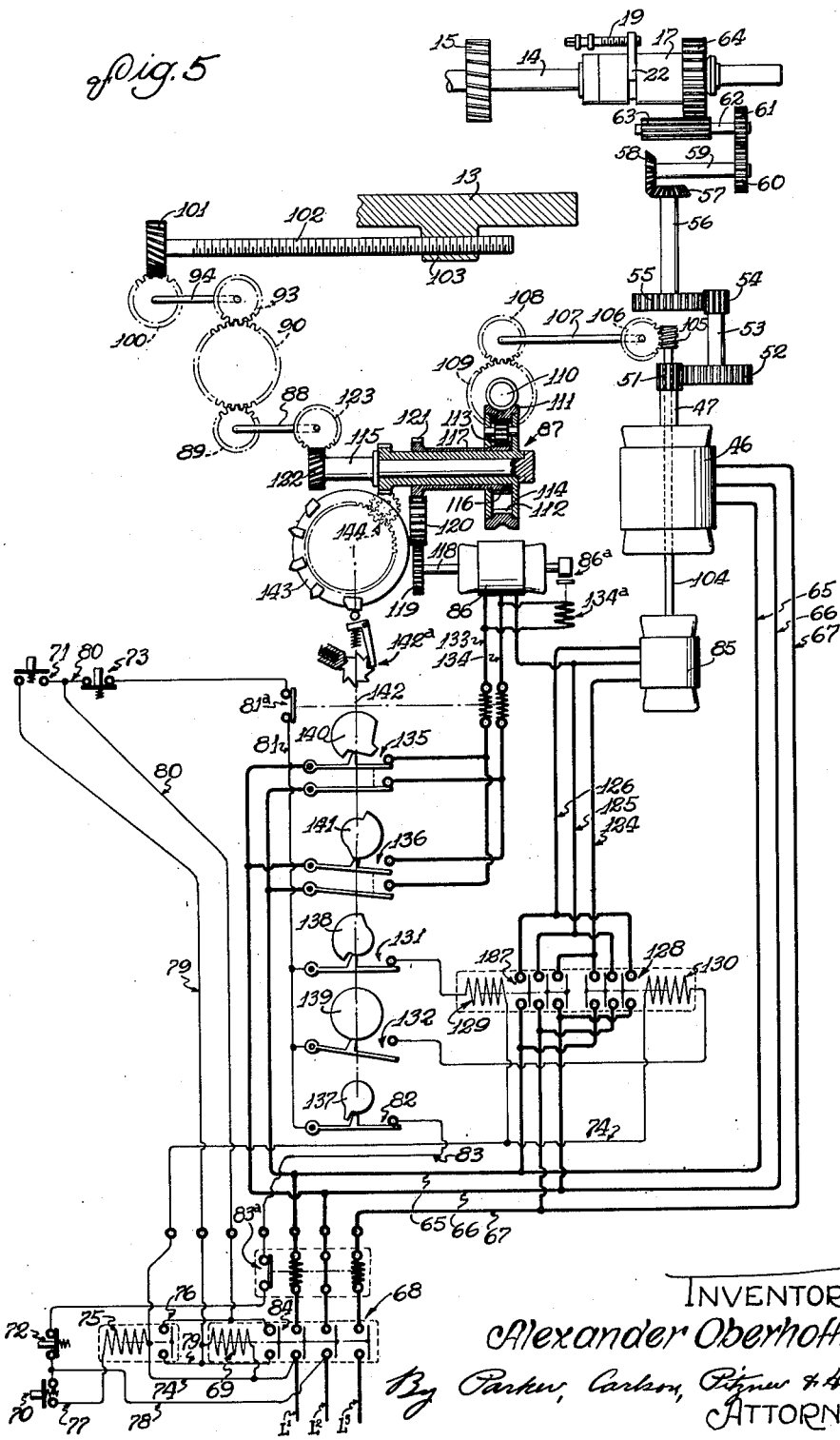

Patented Sept. 6, 1938

2,128,960

UNITED STATES PATENT OFFICE 2,128,960

MILLING MACHINE

Alexander Oberhoffken, Rockford, Ill., assignor to The Ingersoll Milling Machine Company, Rockford, Ill., a corporation of Illinois Application January 13, 1936, Serial No. 58,855

10 Claims. (Cl. 90—16)

The present invention relates to improvements in milling machines, and has particular reference to a machine adapted for the same range of uses as adjustable knee-type milling machines.

In certain well known knee-type milling machines, the work is customarily supported on a reciprocatory carriage mounted beneath and for movement transversely of an overhanging tool spindle. The carriage is supported for adjustment axially of the spindle in guideways on a knee which in turn is mounted for vertical adjustment toward and from the spindle in guideways on the front of a base column.

One of the primary objects of the present invention is to provide a novel milling machine which is adapted for all of the normal uses of a knee-type milling machine, but in which the relative transverse and vertical adjustments between the work and the tool are obtained without employing an adjustable knee and in general without employing transverse and vertical guideways of the foregoing character.

A further object resides in the provision of a new and improved milling machine in which the reciprocatory work carriage is mounted directly on a fixed support, and in which the transverse and vertical adjustments between the work and the tool are effected solely through suitable adjustments of the tool spindle.

Still another object resides in the provision of a new and improved milling machine in which the tool spindle is mounted in the free end of a generally horizontal pivotal support movable into different angular positions to effect vertical adjustment of the spindle, and in which the spindle is adapted to be mounted in different axial positions within the support to effect adjustment transversely of the carriage.

A more specific object is to provide a pivotal spindle support which constitutes a unitary self-contained power pack for driving the spindle and for reciprocating the carriage in either direction at a feed or rapid traverse.

Another object resides in the provision of a drive connection between the power pack and the carriage which comprises a shaft coaxial with the pivotal mounting of the pack so that the connection will be uneffected by adjustment of the pack into different angular positions.

Further objects and advantages will become apparent as the description proceeds.

In the accompanying drawings, Figure 1 is a perspective view of a machine embodying the features of my invention.

Fig. 2 is a vertical sectional view of the machine taken substantially along line 2—2 of Fig. 3.

Fig. 3 is a fragmentary end view of the machine partially in vertical section along line 3—3 of Fig. 2.

Fig. 4 is a fragmentary horizontal sectional view taken substantially in the plane of line 4—4 of Fig. 2.

Fig. 5 is a diagrammatic representation of the driving mechanism within the power pack, and the connections therefrom to the carriage and the tool spindle.

Referring more particularly to the drawings, the machine constituting the exemplary embodiment of the invention comprises a hollow base 6 which is formed integral with a horizontal bed 7 on the top of the front portion, and with an upstanding marginal wall 8 defining a channel 9 about the bed. The rear portion of the base 6 is formed with a short pedestal or upstanding support 10 extending in parallel spaced relation along the bed 7. Formed in the top of the bed 7 is a longitudinal horizontal dove-tailed guideway 11 slidably confining a complementary guide 12 on the underside of a reciprocatory work carriage 13. It will be evident that the base 6 with the bed 7 constitutes a non-adjustable fixed support for the carriage 13. Excepting for the guideway 11 and guide 12, for permitting traverse movements of the carriage 13, the construction avoids the use of any guideways for set-up adjustments, and hence is simple and inexpensive, and provides a sturdy and rigid work support.

Overhanging and extending transversely of the carriage 13 is a spindle 14 adapted to support a removable tool, such for example as a rotary milling cutter 15. The rear end of the spindle 14 is suitably journaled and mounted for axial adjustment in a support 16 on the pedestal 10. It will be evident that the axial adjustment of the spindle 14 affords means whereby the cutter 15 can be adjusted transversely of the work without requiring transverse guideways for the carriage 13.

Preferably, the spindle 14 extends through and is journaled in a quill 17 (see Fig. 4) mounted for axial adjustment in a bearing sleeve 18 integral with an opening to the front of the support 16. Any suitable means may be provided for adjusting the quill 17, and in the present instance it is shown as comprising an adjusting screw 19 rotatably anchored against endwise movement in a plate 20 bolted to the front of the support 16, and having a squared end 21 for engagement by a hand tool (not shown).

The screw 19 extends rearwardly into threaded engagement with a shoe 22 engaging in a peripheral groove 22ª in the quill 17, movable along a guide slot 23 in the top wall of the bearing sleeve 18. Suitable clamping means may be provided for securing the quill 17 in any position of axial adjustment.

At the forward end, the spindle 14 is rotatably supported in a depending bearing bracket 24. This bracket is slidably mounted on an overarm 25 which projects from the support 16 to the front of the base 6.

The spindle support 16 is in the form of an elongated housing which extends generally horizontally along the rear of the carriage 13, and which is mounted at one end on the pedestal 10 for swinging movement about a horizontal axis extending transversely of the carriage. The spindle 14 is journaled in the free end of the housing 16, and hence is oscillatory therewith to effect a relative vertical adjustment between the cutter 15 and the work. Consequently, such adjustment is obtained without requiring a vertically adjustable knee and adjusting means therefor of sufficient strength to carry the relatively heavy weight of the knee and the parts normally mounted thereon.

More particularly, the right end portion of the housing 16 is formed on the underside with a transverse lug 26 pivotally mounted on the adjacent ends of the two aligned pivot members 27 and 28 secured to and projecting inwardly respectively from the front and rear walls of the pedestal 10. The left end face of the housing 16 is arcuate in form with the pivotal axis as a center, and extends in close relation to the top wall 29 of the pedestal 10. A depending adjusting bolt 30, having a squared and flanged head 31 rotatably seated in a recess 32 in the wall 29, extends into the pedestal 10 and through an apertured lug 33 on the extreme end of the housing 16. A nut 34 threaded onto the lower end of the bolt 30 underlies the lug 33 to support the housing 16 in position of angular adjustment. The weight of the housing 16 serves to hold the lug 33 against the nut 34 at all times. A depending apron 35 provides a closure for the hollow pedestal 10 when the housing 16 is raised.

Mounted on the extreme forward end of the overarm 25 is a depending bracket 36 having a bearing 37 adapted to receive the spindle 14 when the latter is adjusted axially into fully projected position. The bracket 36 has an extension arm 38 disposed against a clamping face or pad 39 on the front wall of the base 6, and formed with an arcuate slot 40 struck about the pivot 27—28 as a center. Two headed bolts 41 extend through the slot 40 and are threaded into the face 39. It will be seen that when the bolts 41 are released the bolt 30 may be turned to adjust the angular position of the housing 16 and thereby to adjust the vertical position of the cutter 15 relative to the carriage 13. Thereupon, one or the other or both of the bolts 41 may be tightened to clamp the parts securely in position of adjustment. The top, front and rear walls of the pedestal 10 are constructed substantially to expose the top and sides of the housing 16.

In the preferred form of the invention, the support 16 not only serves as a housing for the spindle mounting but also encloses in one unitary self-contained structure the means for driving the spindle 14 and traversing the carriage 13. The support 16 constitutes a power unit which may provide a drive of any suitable character, herein disclosed as electrical. Thus, the external housing of the power pack 16 is made up of a plurality of aligned and connected sections 42, 43 and 44, a plate 45 being interposed between the latter two.

The drive for the spindle 14 is taken from an electric motor 46 mounted within the section 43, and having a tubular shaft 47 suitably journaled at its ends in internal webs or walls 48 and 49. A fan 50 is fixed on one end of the shaft 47. The other end of the shaft 47 is connected through gears 51 and 52 to a parallel shaft 53 extending through the wall 45 into the section 44. The shaft 53 in turn is connected through gears 54 and 55 to a shaft 56, then bevel gears 57 and 58 to a perpendicular shaft 59 and then through gears 60 and 61 to a shaft 62 parallel to the spindle 14. Each of these shafts 56, 59 and 62 is suitably journaled in the section 44. Fixed on the shaft 62 is an elongated gear 63 meshing in all positions of relative axial adjustment with a gear 64 secured to and movable with the tool spindle 14.

The spindle drive motor 46 has power inlet lines 65, 66 and 67 adapted to be connected, by a master relay switch 68 having an actuating coil 69, to supply mains $L_1$, $L_2$ and $L_3$. Excitation of the coil 69 is under the control of either of two normally open starting switches 70 and 71 which may be located for convenience at spaced points and which are associated respectively with two normally closed stop switches 72 and 73.

Upon closing the switch 70, a circuit is completed from the main $L_1$ through a line 74, the energizing coil 75 of a relay switch 76, a line 77, the switch 70, and a line 78 to the main $L_2$. Energization of the coil 75 closes the switch 76 to complete a circuit from the main $L_1$ through the line 74, the coil 69, a line 79, the switch 76, a line 80, the stop switch 73, a line 81, a cycle stop switch 82, a line 83, the stop switch 72 and the line 78 to the main $L_2$. Interposed respectively in the lines 81 and 83 are two overload switches 81ª and 83ª. The coil 69 when energized closes the master switch 68 and also closes a switch 84 which establishes a holding circuit, across the switch 76 from the line 79 to the line 80.

Upon closing the switch 71 instead of the switch 70, a circuit is completed from the main $L_1$ through the line 74, the coil 69, the line 79, the switch 71, the line 80, the switch 73, the line 81, the switch 82, the line 83, the switch 72, and the line 78 to the main $L_2$ to energize the coil 69 and thereby to close the switches 68 and 84. In this instance, the switch 84 establishes the holding circuit across the switch 71 from the line 79 to the line 80.

The power pack is adapted to drive the carriage 13 in either direction at a feed or rapid traverse, and hence comprises a feed motor 85 and a rapid traverse motor 86 connected through a differential mechanism 87 to a power outlet shaft 88 journaled in and extending through the pivot sleeve 27 to the front of the pedestal 10. From the shaft 88, the drive to the carriage 13 continues through a gear 89, an idler gear 90 on a stub shaft 91 mounted in a bearing 92 in the front wall of the pedestal 10, and a gear 93 on a shaft 94 journaled at the rear end in a bearing 95 in said front wall. The gears 89, 90 and 93 are located within a recess 96 in the front wall of the pedestal 10 and normally closed by a cover plate 97.

The front end of the shaft 94 is journaled in spaced bearings 98 within a bracket 99 bolted to one end of the bed 7. Fixed on the shaft 94 between the bearings 98 is a spiral gear 100 which meshes with a spiral gear 101 on a drive screw 102 rotatably anchored at one end in the bracket 99. The screw is in threaded engagement with a lug 103 on the underside of the carriage 13. By reason of the coaxial relation of the shaft 88 and the pivot sleeve 27, the drive to the carriage 13 is connected in all angular positions of the power pack 16. It will thus be seen that a drive connection for the carriage is had which is capable of transmitting a heavy torque load since it is constituted by gears and like rigid elements as distinguished from belts, chains, and similar flexible elements.

The feed motor 85 has a shaft 104 extending through the tubular shaft 47, and connected through a worm 105 and worm wheel 106 to a perpendicular shaft 107. This shaft is connected through gears 108 and 109 to a worm 110 in mesh with a worm wheel 111 serving as the inlet of the differential mechanism 87. The worm wheel 111 is rigid with an internal gear 112 which meshes with a plurality of idler gears 113 rotatable in a cage 114 on a differential outlet shaft 115. A central gear 116, on a normally stationary shaft 117 rotatable on the shaft 115, meshes with the gears 113. The rapid traverse motor 86 has a shaft 118 connected through gears 119, 120 and 121 to the shaft 117.

When the rapid traverse motor 86 is idle, a brake 86ª prevents rotation of the gear 116, and the feed drive in either direction causes the gears 113 to roll about the gear 116 to drive the shaft 115. This drive is supplemented by rotation of the gear 116 to obtain a rapid traverse when operation of the motor 86 is instituted. The shaft 115 has a spiral gear 122 which meshes with a spiral gear 123 on the shaft 88, and which is adapted to roll on the gear 123 upon angular adjustment of the power pack 16.

The feed motor 85 is reversible and has three power inlet lines 124, 125 and 126 which are adapted to be connected reversibly to the lines 65, 66 and 67 by two selectively operable direction relay switches 127 and 128 having energizing coils 129 and 130. When the master switch 68 is closed, the coil 129 is adapted to be connected by a direction control switch 131 from the line 74 to the line 81 to institute a carriage feed drive in one direction. Similarly, the coil 130 is adapted to be connected by a direction control switch 132 in a circuit across the lines 74 and 81 to institute a feed drive in the reverse direction.

The rapid traverse motor 86 is also reversible and has three power inlet lines 125, 133 and 134. The connection of the line 125 to the main supply lines L₁, L₂ and L₃ is not altered by the direction switches 127 and 128. The lines 133 and 134 are adapted to be reversibly connected to the lines 65 and 66 respectively by two direction control switches 135 and 136 to effect a rapid traverse drive in one or the other direction. A brake solenoid 134ª connected across the lines 133 and 134 releases the brake 86ª when the motor 86 is energized.

Preferably, the carriage 13 is reciprocated through an automatic movement program comprising, for example, a predetermined cycle of rapid traverse and feed movements. To this end, the respective switches 82, 131, 132, 135 and 136 normally tend to close and are adapted to be opened in predetermined timed sequence by a series of cams 137 to 141 inclusive. These cams are mounted on a common actuator, such as a shaft 142, to which a step-by-step movement is imparted by a pawl and ratchet mechanism 142ª actuated by a control disk 143 driven through a train of gears 144 from the shaft 115 in timed relation to the carriage movement.

Assuming that the parts occupy the positions illustrated in Fig. 5, the switch 82 is closed to maintain the circuits, and the switches 131 and 135 are closed to establish a rapid traverse carriage drive in one direction. In the subsequent rotation of the shaft 142, the switch 135 will be opened by the cam 140 to stop the rapid traverse motor 86. Thereupon a feed drive in the same direction is obtained. Subsequently, the cam 140 again closes and then opens the switch 135 to effect a second rapid traverse movement followed by a second feed still in the same direction. Upon further rotation of the shaft 142, the cam 138 opens the switch 131 and simultaneously the cams 140 and 141 respectively open the switch 135 and close the switch 136 to reverse the rapid traverse motor 86, thereby instituting a rapid traverse of the carriage 13 in the reverse direction. In the present cycle, member 139 is circular and holds the switch 132 open at all times to prevent a reverse feed, and the cams 140 and 141 are shaped to maintain the switches 135 and 136 in one position during the rapid return of the carriage to initial position. At the end of the quick return movement of the carriage 13, the cam 137 opens the switch 82 to stop the machine.

While one definite program cycle has been illustrated, it is to be understood that the cycle is determined by the specific character of the control cams 138 to 141, and that by the use of different cams, other program cycles may be obtained. For a more detailed understanding of the electric differential drive and the cycle control reference may be had to my copending application Serial No. 723,136, filed April 30, 1934, Patent No. 2,040,872, May 19, 1936.

I claim as my invention:

1. A machine tool comprising, in combination, a base, a carriage mounted for horizontal reciprocation on said base, means for traversing said carriage, a tool head mounted on said base for pivotal adjustment about an axis extending transversely of said carriage, a spindle mounted in one end of said head and extending over said carriage and being vertically adjustable relative to said carriage upon angular adjustment of said head, unitary self-contained power drive means in said head including an outlet shaft journaled in said base on said axis, and a drive connection from said shaft to said first mentioned means.

2. A machine tool comprising, in combination, a base, a carriage mounted for horizontal reciprocation on said base, nut and screw means for traversing said carriage, a tool head mounted on said base for pivotal adjustment about an axis extending transversely of said carriage, a rotary spindle mounted for axial adjustment in one end of said head and extending over said carriage and being vertically adjustable relative to said carriage upon angular adjustment of said head, unitary self-contained power drive means in said head including a connection to said spindle and an outlet shaft journaled in said base on said axis, and a drive connection from said shaft to said first mentioned means.

3. A milling machine comprising, in combination, a horizontal base having an upstanding pedestal, a carriage mounted for reciprocation on said base, a unitary self-contained power pack pivotally mounted in said pedestal on an axis extending transversely of said carriage and having a counterweight tending to move said head in one angular direction, adjustable means for supporting said head in different angular positions against the force of said counterweight, an overarm movable with said power pack and extending over said carriage, a depending arm on said overarm, releasable means for clamping said depending arm to the front of said base, a spindle mounted in said head for oscillatory movement therewith and extending over said carriage, and power drive means in said pack for driving said spindle and traversing said carriage.

4. A milling machine comprising, in combination, a horizontal base having an upstanding pedestal, a carriage mounted for reciprocation on said base, a unitary self-contained power pack pivotally mounted in said pedestal on a horizontal axis and having a counterweight tending to move said head in one angular direction, adjustable means for supporting said head in different angular positions against the force of said counterweight, an arm movable with said power pack, means for clamping said arm to said base, a rotary spindle mounted in said head for oscillatory movement therewith and extending over said carriage, and power drive means in said pack for traversing said carriage.

5. A milling machine comprising, in combination, a horizontal base having an upstanding pedestal, a carriage mounted for horizontal reciprocation on said base, a gear housing mounted on said base at one end of said carriage, a screw anchored in said housing and in threaded engagement with said carriage, a transverse shaft geared to said screw in said housing and extending rearwardly to said pedestal, a pivot sleeve mounted in said pedestal, a shaft coaxial with said sleeve and geared to said first mentioned shaft and having a drive gear, a self-contained power pack pivotally mounted on said sleeve and enclosing variable speed drive means having an outlet gear meshing with said first mentioned gear and adapted to roll thereon upon pivotal movement of said pack, and a rotary spindle mounted for axial adjustment in said pack and extending transversely over said table, said spindle being adjustable relatively toward and from said carriage upon pivotal movement of said pack.

6. A milling machine comprising, in combination, a horizontal base having an upstanding pedestal, a carriage mounted for horizontal reciprocation on said base, means for traversing said carriage, a transverse shaft connected to said means and extending rearwardly to said pedestal, a pivot sleeve mounted in said pedestal, a shaft coaxial with said sleeve and geared to said first mentioned shaft and having a drive gear, a self-contained power pack pivotally mounted on said sleeve and enclosing drive means having an outlet gear meshing with said first mentioned gear and adapted to roll thereon upon pivotal movement of said pack, and a rotary spindle mounted in said pack and extending transversely over said table, said spindle being adjustable relatively toward and from said carriage upon pivotal movement of said pack.

7. A machine tool comprising, in combination a base, a carriage mounted for horizontal reciprocation on said base, a tool head mounted on said base for pivotal adjustment about an axis, a spindle mounted in one end of said head and extending over said carriage and being vertically adjustable relative to said carriage upon angular adjustment of said head, means for adjusting said head, unitary self-contained power drive means in said head including a drive motor connected to said spindle and rapid traverse and feed motors constituting a variable speed power source, and means for connecting said source to said carriage and including a shaft journaled in said base on said axis.

8. A machine tool comprising, in combination, a base, a carriage reciprocable on said base, a tool head mounted on said base for pivotal movement about an axis extending transversely of said carriage, and a rotary tool spindle mounted for axial adjustment in said head and extending parallel to said axis across said carriage, means for axially adjusting said spindle, a gear on said spindle, a gear rotatable in said head on an axis parallel to that of said first mentioned gear, one of said gears being elongated to mesh with the other gear in all axial positions of adjustment of said spindle, and unitary power drive means in said head connected to said second mentioned gear.

9. A milling machine comprising, in combination, a horizontal base having an upstanding pedestal, a carriage mounted for reciprocation on said base, a tool head pivotally mounted on said pedestal on an axis extending transversely of said carriage, adjustable means for supporting said head in different angular positions, an overarm movable with said head and extending over said carriage, a depending arm on said overarm, releasable means for clamping said depending arm to the front of said base, a spindle mounted in said head for oscillatory movement therewith and extending over said carriage, and power drive means for driving said spindle and traversing said carriage.

10. A milling machine comprising, in combination, a horizontal base having an upstanding pedestal, a carriage mounted for reciprocation on said base, a tool head mounted on said pedestal on an axis extending transversely of said carriage, adjustable means for supporting said head in different angular positions, an overarm movable with said head and extending over said carriage, a depending arm on said overarm, releasable means for clamping said depending arm to the front of said base, an axially adjustable spindle mounted in said head for oscillatory movement therewith and extending over said carriage adjacent said overarm and substantially parallel thereto, means for supporting the outer end portion of said spindle in its axially adjusted position from an adjacent portion of said overarm, and power drive means for driving said spindle and traversing said carriage.

ALEXANDER OBERHOFFKEN.